United States Patent
Broyles et al.

(10) Patent No.: US 6,824,804 B2
(45) Date of Patent: Nov. 30, 2004

(54) PECAN PROCESSING METHOD AND SYSTEM

(75) Inventors: David J. Broyles, Lamesa, TX (US);
Michael C. Broyles, Lamesa, TX (US);
Cathy W. Broyles, Lamesa, TX (US);
Andrew D. Broyles, Lamesa, TX (US)

(73) Assignee: Broyles Properties, Ltd., Lamesa, TX (US)

( * ) Notice: Subject to any disclaimer, the term of this patent is extended or adjusted under 35 U.S.C. 154(b) by 329 days.

(21) Appl. No.: 09/965,276

(22) Filed: Sep. 27, 2001

(65) Prior Publication Data

US 2003/0059508 A1 Mar. 27, 2003

(51) Int. Cl.[7] ................................................ A23L 1/00
(52) U.S. Cl. ...................................... 426/481; 426/482
(58) Field of Search ................................. 426/481, 482

(56) References Cited

U.S. PATENT DOCUMENTS

| | | | |
|---|---|---|---|
| 853,066 A | 5/1907 | Crellin | ........................ 99/569 |
| 1,564,914 A | 12/1925 | Vaughn | |
| 1,594,702 A | 8/1926 | Williams | |
| 2,265,588 A | 12/1941 | Walker | ........................... 146/8 |
| 2,279,987 A | 4/1942 | Guerra | ........................... 146/8 |
| 2,319,757 A | 5/1943 | Vigneau | ........................ 99/569 |
| 2,504,374 A | 4/1950 | Baldwin | ......................... 46/11 |
| 2,506,848 A | 5/1950 | Turner | ........................... 146/11 |
| 3,789,592 A | * 2/1974 | Croft | .......................... 56/328.1 |
| 3,962,072 A | * 6/1976 | Ramacher et al. | ........... 209/140 |
| 4,347,260 A | 8/1982 | Crompton | .................... 426/483 |
| 5,467,700 A | 11/1995 | Dowell et al. | ................. 99/570 |
| 5,879,734 A | 3/1999 | Broyles | ....................... 426/481 |
| 6,135,020 A | 10/2000 | Broyles | ........................ 99/569 |

* cited by examiner

Primary Examiner—Anthony Weier
(74) Attorney, Agent, or Firm—Mark E. Scott; Conley Rose, P.C.

(57) ABSTRACT

A pecan processing method and system is described that increases the efficiency of pecan processing. In particular, pecan parts that fall beneath the cracker, secondary cracker product, are conveyed to an air separation device which removes dust and shells for disposal, and the remaining portion of the secondary cracker product is conveyed to width separation devices. In a second aspect, a largest width range of the cracker product after width separation is shelled by parallel, rubber-coated cylinders and then thickness separated into uncracked nuts and substantially whole cracked nuts. The uncracked nuts and the substantially whole cracked nuts are then separated, and only the uncracked nuts are returned to the cracker. The substantially whole cracked nuts are returned to the width separation device.

33 Claims, 5 Drawing Sheets

PECAN PROCESSING METHOD AND SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention are directed to increasing nut shelling efficiency. More particularly, the preferred embodiments are directed to increasing the value of a shelled crop of nuts by decreasing the amount of breakage of the meat of the nuts and decreasing the amount of shell in the final product. More particularly still, the preferred embodiments are directed to increasing the percentage of halves created in pecan processing facilities, decreasing breakage, and decreasing shell in the final product.

2. Background of the Invention

U.S. Pat. No. 5,879,734 (the '734 patent), incorporated herein by referenced as if reproduced in full below, describes that before the '734 patent, and referring to FIG. 1, the technology in the mass mechanical shelling of pecans involved sizing pecans from the orchard in a sizer 80 and then feeding pecans of a particular size to a cracker 82 to produce cracker product. From there, and again prior to the '734 patent, all the cracker product was fed directly to the sheller 86. A sheller, as the name implies, is designed to remove the woody exterior, the shell of the pecan, from the pecan meat. Because pecan meat typically has a series of lines or crevasses extending longitudinally on an outer portion thereof, portions of the shell may remain attached to the meat even if the rest of the shell has broken and fallen away. When a piece of shell remains attached to the meat, this meat and shell combination are referred to as a "stick-tight." If all the woody shell has been removed from the meat, it is referred to as "stick-tight free." In the art before the '734 patent, all the cracker product from the cracker 82 was fed to the sheller 86, regardless of whether any particular piece was stick-tight or stick-tight free. From the sheller 86 of the art before the '734 patent, the various pecan parts, including shells and meat, were fed to a width screen 88, where the cracker product was separated by width. Each width category was then fed to an air separation device where the heavier meat was separated from the lighter shells in an upward flowing air stream. The air separators of the art before the '734 patent may have included a large separator 94, an extra large separator 92, a halves separator 90, and various additional separators 96 for the smaller pecan pieces.

The '734 patent describes an improvement over the art before the '734 patent which bypasses the sheller with a portion of the cracker product that does not need to be sent to the sheller. These pecan parts may include stick-tight free halves, stick-tight free extra large pecan pieces, and stick-tight free large pecan pieces. In the '734 patent, separating the cracker product to bypass the sheller is accomplished in part with a series of stacked vibrating screens.

In U.S. Pat. No. 6,135,020 (the '020 patent), incorporated herein by reference as if reproduced in full below, a second embodiment for separating the cracker product to bypass the sheller is disclosed that comprises a series of co-planar screens, with each screen having a plurality of uniform sized holes therein. In particular, the '020 patent describes that the cracker product is applied to a first screen 108, indicated by line 106 in FIG. 1. The '020 patent teaches that the graduation or width range of the cracker product that falls through the first screen 108 may be classified as mediums, smalls, midgets and/or dust. That width graduation of the cracker product that falls through the first screen 108 is applied to the width screen 88. That portion of the cracker product that does not fall through the first screen 108 is conveyed, by vibratory motion of the co-planar screens, to the second screen 110, which separates from the remaining cracker product by width into a graduation being the large meat pieces and shells of substantially the same size. The large piece graduation that falls through the second screen 110 is applied to a first slot 130. The first slot 130 separates the large meat pieces and shells of substantially the same size by thickness, with greater thickness pieces being stick-tight meat and large shells, and smaller thickness pieces being stick-tight free meat and smaller shells. The portion of the graduation that falls through the first slot 130 is applied to the air separator 94 of the prior art. The portion that does not fall through the first slot 130 is applied to the sheller 86 of the prior art.

The '020 patent further describes a third screen 112 and a fourth screen 114, and respective slots 136 and 142. The third screen 112 is sized to allow extra large pieces to fall therethrough. The fourth screen is sized to allow halves to fall therethrough. The second slot 136 and third slot 142 are each designed to separate the width graduations of the primary cracker product falling through the third and fourth screens respectively by thickness to separate stick-tight meat from stick-tight free meat, along with some shell.

Finally, the '020 patent and the '734 patent each describe that whole, uncracked pecans and substantially whole cracked pecans are applied to double rollers 148. In the co-planar screen arrangement of the '020 patent, this category or portion of cracker product is that portion which did not fall through any of the width separation screens 108–114. In the '020 patent, this category of cracker product is fed to the double rollers 148, where further shelling takes place. After being further shelled and broken up, the product is conveyed to a fourth slot 150 where yet another thickness separation is made. Product that falls through the fourth slot 150 represents pecan pieces, stick-tight pieces, halves and stick-tight halves that were further cracked by the double rollers 148, and these are therefore applied to the first screen 108 for further processing. That portion of the cracker product that does not fall through the fourth slot 150 is then directed, as shown in FIG. 1, back to the cracker 82.

While the disclosures of the '734 and '020 patents represent the most significant steps in pecan processing since the early 1900's, there may be room for improvement. In particular, crackers 82 are specifically designed to crack whole, uncracked nuts. If nuts previously cracked are applied to the cracker 82, the cracker has the tendency to apply too much cracking force to the particular pecan, which creates breakage of the meat.

Relatedly, present day crackers effectively have two product streams. The crackers produce a primary product stream of nuts and nut parts typically at an output spout. This primary cracker product is typically conveyed to the next step in the process by means of gravity, elevator legs, vibratory chutes, and the like. However, and as was not discussed in the '734 and '020 patents, there is a secondary product stream associated with modern day crackers. While the great majority of what is produced by the cracker leaves as primary cracker product, crackers also produce what will be termed secondary cracker product, being shells and meat parts which are thrown in various directions based at least in part on the transfer of momentum from cracking hammers or shuttles to the pecans. Most crackers are surrounded by metallic or plastic material which captures the secondary cracker product and forces it to fall to a pan below the cracker. The standard in the pecan processing art is to use a shovel to scoop the secondary cracker product from the pan beneath the cracker onto the width separation device. While this procedure is effective for getting the secondary cracker product into the separation process, it has two downfalls in particular: 1) the secondary cracker product is mostly pecan shells, dust, whole cracked and uncracked nuts, and to a lesser degree meat—immediate width separation is not the most efficient way to handle the secondary cracker product; and 2) pecan processing facilities produce food grade pecan meat, and it is common that the shovel used to move the secondary cracker product from the pan to the separating device is the same shovel that operators use to gather waste from the processing plant floor.

Thus, what is needed in the art is a way to convey and process the secondary cracker product which does not rely on the manual shovel technique and which more effectively handles the mixture of shells and meat therein. Further, what is needed is a way to ensure that, substantially only whole, uncracked pecans are returned to the cracker 82.

BRIEF SUMMARY OF THE INVENTION

The problems noted above are solved in large part by a structure and related method for automatically conveying the secondary cracker product to the separation screens. In particular, the secondary cracker product is preferably moved by a vacuum conveying device which transfers the secondary cracker product to an aspirator. In the aspirator, the dust, shells, meat and whole cracked and uncracked nuts are separated by weight in an air separation process. That portion of the secondary cracker product which is heavier is preferably fed to a series of co-planar screens. That portion of the secondary cracker product which is lighter, representing shells and dust, is preferably sent to a cyclone separator where the heavier pieces are separated and disposed of, and the lighter pieces are handled in a dust collection system.

In a second aspect of the preferred embodiments, the overall cracker product that has not fallen through any of the preferred four screens of the width separation device passes to a set of rubber rollers. The product stream leaving the rubber rollers is then preferably sent to another width separation device, preferably designed to separate whole, uncracked pecans and substantially whole cracked pecans from the remaining pieces. The whole, uncracked pecans and substantially whole cracked pecans are then separated in a pin separator, with the whole uncracked pecans preferably going back to the cracker, and the substantially whole cracked pecans preferably entering the process anew at the co-planar screens.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function. In the following discussion and in the claims, the terms "including" and "comprising" are used in an open-ended fashion, and thus should be interpreted to mean "including, but not limited to . . . ".

The preferred embodiments of the present invention were developed in the context of pecan processing. Thus, the following description of the preferred embodiments is given in terms of a pecan processing facility shelling pecans; however, the structures and methods described herein may be equally applicable to other types of nut processing facilities. The following detailed description of the preferred embodiments should not be construed as limiting the structures and method disclosed herein only to pecan shelling.

DETAILED DESCRIPTION OF THE PREFERRED EMBODIMENTS

Figure 1:
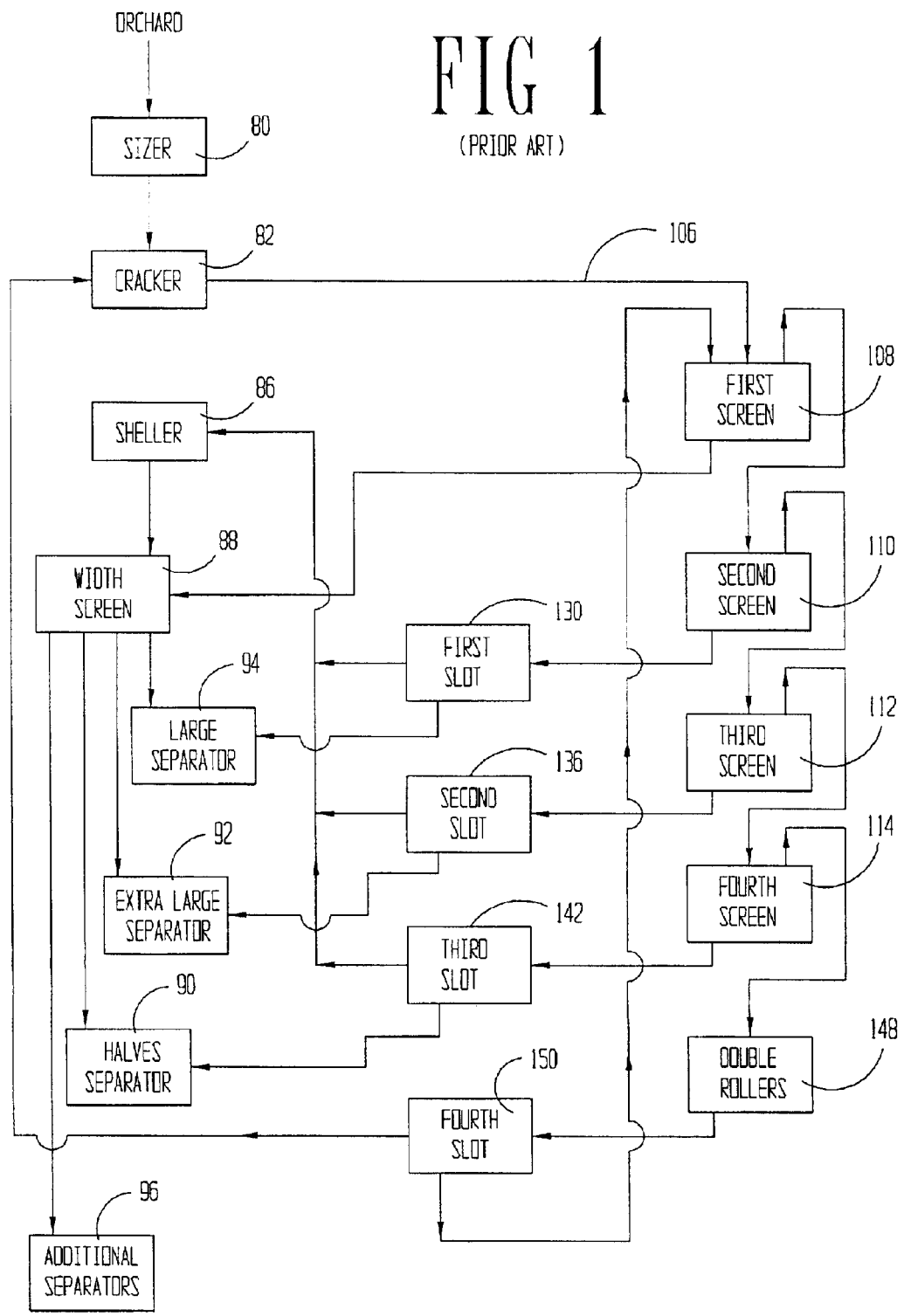
FIG. 1 shows a block diagram of a pecan shelling process of the prior art.
Figure 2:
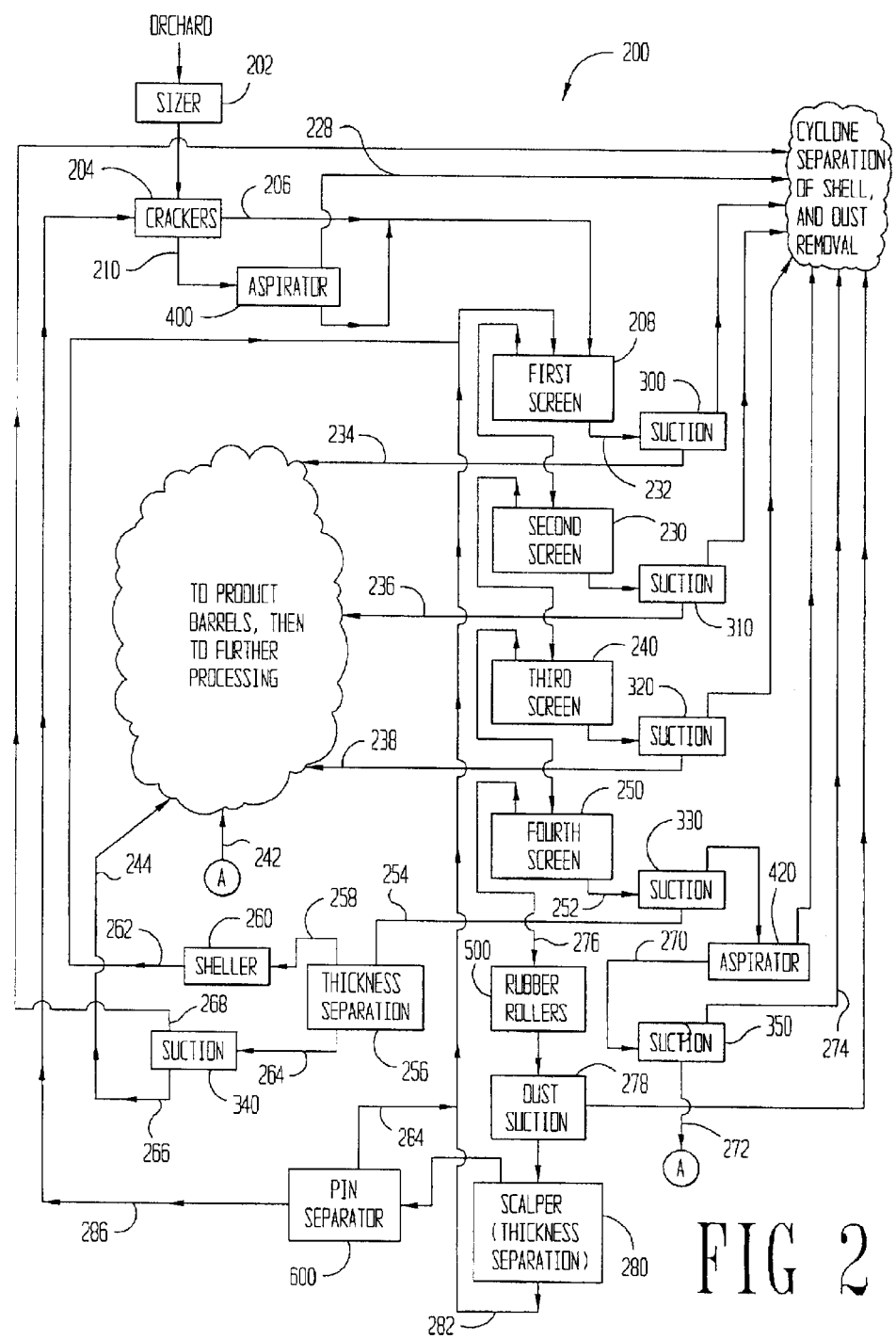
FIG. 2 shows a block diagram of a pecan shelling process of the preferred embodiment.

FIG. 2 shows a flow diagram of a nut processing system 200 of the preferred embodiment. In particular, pecans from an orchard are preferably placed in a sizer 202 which sorts the pecans by thickness into thickness ranges. Although FIG. 2 shows that from the sizer 202 nuts of a particular thickness range go to the cracker 204, one of ordinary skill in the art understands that between the sizer and the cracker is a hot water bath step. This step not only kills bacteria on the outer shells of the pecans, but also increases the moisture content of the shells to aid in the cracking and shelling process. Cold water may also be used in this conditioning step.

After the water treatments, pecans of a particular thickness range are applied to the crackers 204. Although only one box is shown in FIG. 2, in the preferred embodiment four crackers are used. Preferably, each cracker is capable of producing 800 cracked nuts per minute, and thus the total number of cracks per minute achieved in the preferred embodiment is approximately 3200. However, the present invention is not limited to any particular number of crackers or cracks per minute.

As the name implies, crackers are responsible for cracking the outer shell of the pecans as an initial step of the pecan shelling process. There are two product streams associated with the crackers 204. In particular, the crackers 204 produce a primary cracker product, which comprises all the nuts and nut parts from the main exit chute or spout of each particular cracker. Further, and as discussed in the Background section, cracking nuts is a somewhat violent process that throws pecans and pecan parts based at least in part on principles of transfer of momentum. These pecans and pecan parts thrown in various directions within the cracker are preferably captured and directed to a pan beneath each cracker 204. One of ordinary skill in the art is aware of this secondary cracker product and how this secondary cracker product falls out of each cracker. The primary cracker product represents the vast majority of the pecans and pecan parts produced by the crackers. The secondary cracker product, while containing some waste shells, also contains valuable pecan meat parts.

Referring again to FIG. 2, the primary cracker product is preferably applied to the first screen 208 as indicated by line 206. Because of the location and placement of the crackers and the screening mechanism that contains the first screen, the primary cracker product is preferably conveyed by means of a vibrating chute and an elevator leg, as are familiar to those of ordinary skill in the art. However, the conveying means for moving the cracker product could also include shovels and belt assemblies. As for the secondary cracker product, the prior art technique was to shovel the secondary cracker product onto the first screen 208. However, in the preferred embodiments, the secondary cracker product is applied to a separation device being an aspirator 400, as indicated by line 210. While moving the secondary cracker product with air inside a conduit is preferred, the secondary cracker product may equivalently be moved to the air separation device using devices such as conveyors, augers, elevators, and the like.

Figure 3:
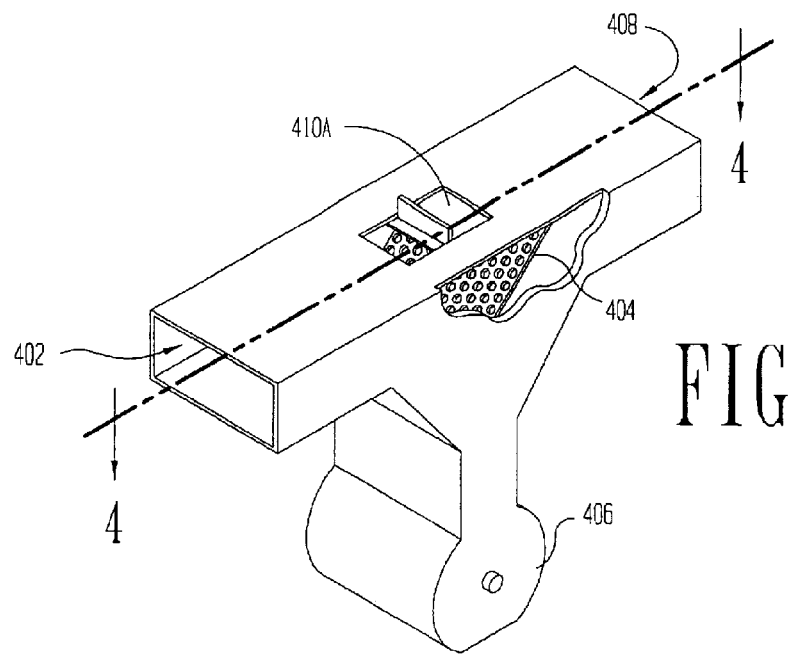
FIG. 3 shows a perspective view of an aspirator of the preferred embodiment.
Figure 4:
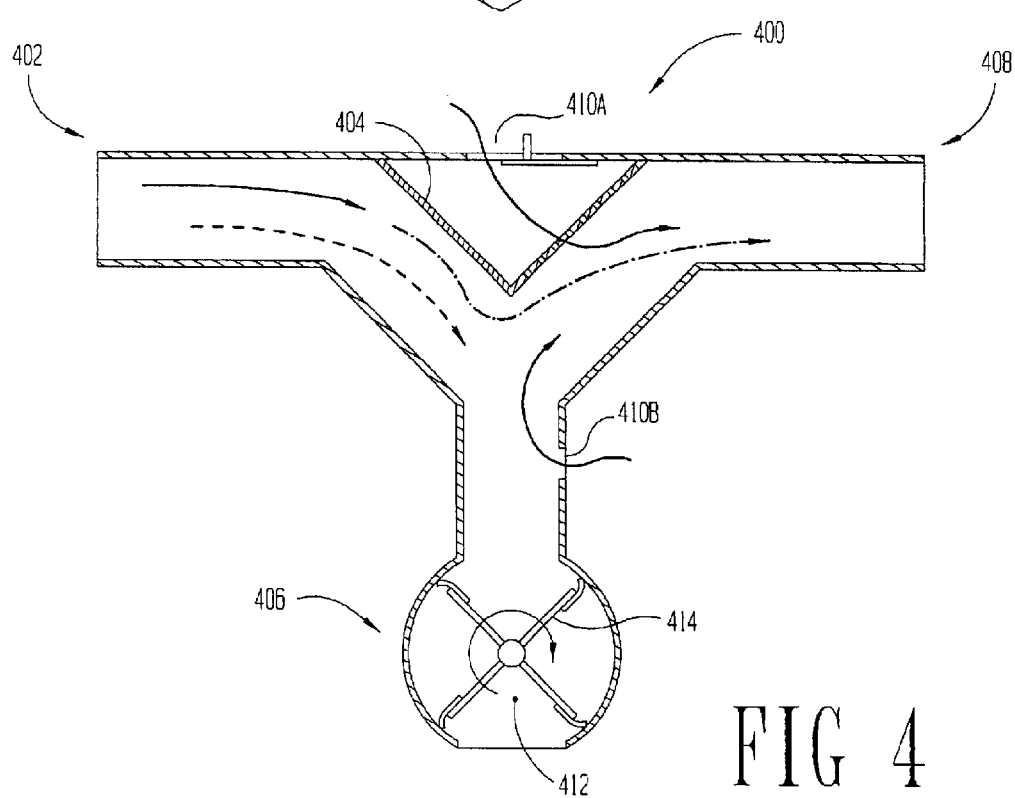
FIG. 4 shows a cross-sectional view of an aspirator of the preferred embodiment taken substantially along line 4—4 of FIG. 3.

In broad terms, the aspirator 400 is a device that separates the secondary cracker product at least in part by weight. FIG. 3 shows a perspective view of aspirator 400 of the preferred embodiments. In particular, cracker product enters the aspirator through its inlet conduit 402. In the preferred embodiment, this inlet conduit 402 has a rectangular cross-section; however, any cross-sectional shape may be used. The secondary cracker product is preferably picked up under the crackers 204 by means of a suction pipe or conduit (not shown). This suction conduit is preferably fluidly connected to the inlet 402 of the aspirator 400. The suction conduit preferably has a partial vacuum therein which creates the movement of air within the internal diameter of the conduit. While it may be possible to transfer the secondary cracker product with a conduit having a positive internal pressure, this is not preferred as it would tend to blow smaller pieces and dust out of the conduit, thus contributing to dust problems within the pecan processing plant. Moving air carrying the secondary cracker product preferably enters the inlet 402 of the aspirator 400 and encounters a baffle 404 which disrupts the air flow. Additional disruption may be caused by air entering the air control port 410A. Heavier parts of the secondary cracker product preferably exit through the air lock 406, while the lighter pieces of the secondary cracker product preferably exit through the aspirator 400 at its outlet conduit 408. FIG. 4 shows a cross-sectional view of the aspirator 400 taken substantially along line 4—4 of FIG. 3.

Air (indicated by solid line in FIG. 4) carrying the heavier nut parts (indicated by a dashed line in FIG. 4) and lighter nuts parts (indicated by a dashed-dot line in FIG. 4) enter through the inlet 402. Within a separation chamber of the aspirator 400, the air and nut parts encounter a solid leading edge of the baffle 404 which partially blocks or interrupts the air flow and forces a change in the direction of the air, heavier nut parts, and lighter nut parts. The aspirator 400 further has a plurality of air control ports 410A,B (some of which may flow through the trailing edge of the baffle 404 through holes therein) through which air flow may be controlled. By adjusting the amount of air flow through the air control ports 410A,B, it is possible to set the aspirator 400 to allow pecan parts having at least a particular weight to fall, as indicated by the dashed line, to the air lock mechanism 406. The air lock mechanism 406 preferably comprises an internal paddle 412 that comprises a plurality of blades 414. The heavier pecan parts or heavier portion preferably falls into the space between two adjacent blades 414. As the paddle 412 rotates, the heavier pecan parts are removed from the vacuum present in the main portion of the aspirator 400, and allowed to drop out of the air lock 406 at its bottom. The lighter pecan parts or lighter portion, indicated by the dash-dot line in FIG. 4, are carried by the air flow within the aspirator 400 through the aspirator's outlet 408. Referring again to FIG. 2, the lighter portion, which in the preferred embodiments represent substantially only pecan shells and dust, are conveyed as indicated by line 228 by means of the air flow to a series of shell and dust separation devices, described more fully below. As for the heavier pecan parts that pass through the air lock 406, these pecan parts preferably are pecan meat and large shells, and these are then preferably conveyed to the first screen 208.

Summarizing the aspirator, the secondary cracker product is picked up in a vacuum process and conveyed to the aspirator 400. Within the aspirator 400, the heavier portions of the secondary cracker product, representing meat and large shells, are separated from the lighter portions of the secondary cracker product, being small shells, dust and the like. The shells, dust and the like, are conveyed through the outlet 408 of the aspirator 400 to other devices for disposal, and the heavier portion of the secondary cracker product is preferably conveyed to the first screen 208. In this way, the secondary cracker product remains in the process without the need of a plant operator shoveling the secondary cracker product into the separation process. Further, before that secondary cracker product is applied to the separation process, some of the otherwise waste product, being pecan shells and dust, are separated in the aspirator 400, thus lightening the load for the remaining separation process. The aspirator device described herein may be referred to in the cotton ginning industry as a "boll box." An aspirator such as that shown in perspective view in FIG. 3 has an overall height of about 3 feet and an overall width of about 2 feet. Thus, the inlet 402 and outlet 408 have a width of about 2 feet and preferably have a height of about six inches. Such devices may be obtained from gin machinery manufacturers such as BC Supply of Lubbock, Tex.

Referring again to FIG. 2, the primary cracker product indicated by line 206, as well as a portion of the secondary cracker product from the aspirator 400, are applied to a width separation device. In the preferred embodiment, the first screen 208, second screen 230, third screen 240, and fourth screen 250 are co-planar screens for width separation as fully described in the second embodiment of U.S. Pat. No. 6,135,020, which is incorporated herein by reference as if reproduced in full below. In particular, the first screen 208 has a plurality of uniform size holes therein. The holes of the first screen are preferably sized to allow a graduation being dust, small and midget pieces to fall therethrough. The small and midget pieces include not only meat in those size ranges, but also shells of substantially the same size. That portion of the cracker product that does not fall through the first screen is preferably conveyed, by vibratory motion of the co-planar screens, to the second screen 230. The second screen 230 preferably has a plurality of uniform size holes therein which are sized to allow a graduation being medium meat pieces and shells of substantially the same size to fall therethrough. That portion of the cracker product that has not fallen through either first screen 208 or the second screen 230 passes to the third screen 240 and fourth screen 250. The third screen 240, in the preferred embodiment, has a plurality of uniform size holes that allow a graduation being large and extra large meat pieces and shells of substantially the same size to fall therethrough. Likewise, the fourth screen 250 has a plurality of uniform size holes that allow a graduation being meat halves and shells of substantially the same size to fall therethrough. Co-planar screens to perform the task described above may be obtained from Southtech Industries of Ariton, Ala., BC Supply of Lubbock, Tex., or Lewis Carter Manufacturing of Donalsonville, Ga.

Thus, in the preferred embodiment, the co-planar screen separates the cracker product applied to the first screen into a series of width ranges or graduations comprising small and midget pieces for the first screen 208, medium pieces for the second screen 230, large and extra large pieces for the third screen 240, and halves for the fourth screen 250. Portions of the cracker product which did not fall through any of the screens, which portions are most likely whole uncracked pecans, substantially whole cracked pecans, and pieces of shell that are larger than halves, are conveyed off the end of the co-planar screens, and are processed as more fully described below.

Figure 5:
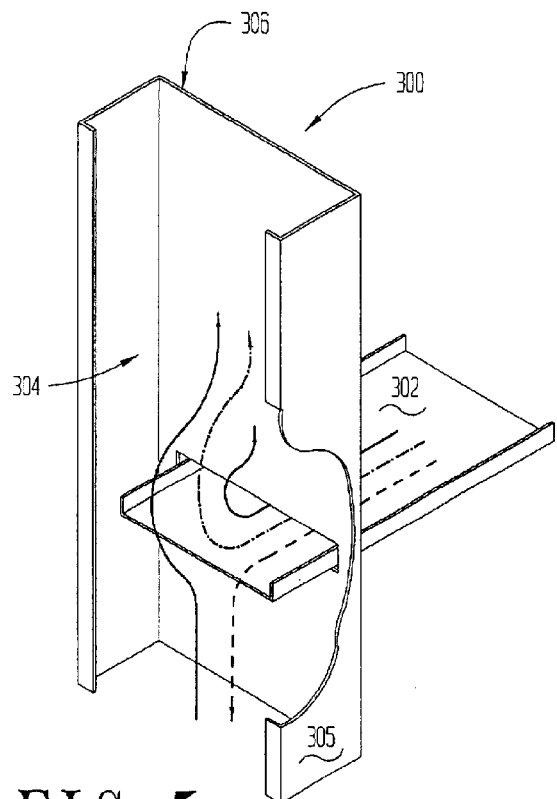
FIG. 5 shows a perspective cut-away view of a suction separation device of the preferred embodiment.

Referring again to the width graduation of the cracker product which falls through the first screen 208, the graduation is preferably conveyed to a suction device 300 as indicated by line 232. In broad terms, the suction device 300 is designed and operated to separate the heavier meat from the dust and lighter shells of substantially the same size. FIG. 5 shows a perspective cut-away view of a suction device 300. In particular, the width graduation of the cracker product that falls through the first screen, which in the preferred embodiments are small and midget meat pieces and shells of substantially the same size, is preferably conveyed to the suction device by means of a vibratory chute 302. Preferably, the chute 302 extends some distance into the air channel 304 of the suction device 300. As indicated in FIG. 5, the air channel 304 preferably comprises a rectangular cross-section into which the vibratory chute 302 penetrates. The closest side wall 305 has been cut away in FIG. 5 to show the relationship between the air channel 304 and the vibratory chute 302. Further, preferably a Plexiglas cover (not shown) defines the frontal boundary of the air channel 304. A fan (not shown) fluidly couples to the outlet 306 of the suction device 300 and creates an upwardly moving air flow (as indicated by the solid line arrow in FIG. 5) within the air channel 304. Thus, the width graduation of the cracker product that falls through the first screen 208 is conveyed by the vibratory motion of the chute 302 into the air channel 304. As these various pieces fall off the end of the chute 302 within the air channel 304, the heavier portions, consisting mainly of meat products, fall in the direction indicated by the dashed line in FIG. 5. The lighter portions, comprising mostly shell and dust, are picked up by the upwardly moving air flow and are carried away thereby, as indicated by the dash-dot line in FIG. 5. In the preferred embodiment, the heavier portion, that product that falls in spite of the upwardly moving air flow, falls within the air channel 304 into a product barrel (not shown) located near the open end of the bottom of the air channel 304. Air flow within the suction device 300 is preferably adjusted so that substantially only meat drops within the air channel 304 in spite of the air flow.

Suction device 300 preferably separates small and midget meat pieces from shells of substantially the same size. Those small and midget meat pieces are then allowed to fall into product barrels (not shown) which are taken for further processing of the prior art, which is beyond the scope of this patent. Suction devices such as those described herein may be obtained from Jesse Aspirator Manufacturing of Chico, Calif. or BC Supply of Lubbock, Tex.

The process of separating the cracker product by width with screens, and then separating that portion of the cracker product that falls through each screen with a suction device is repeated for the second screen 230 and third screen 240. In particular, the width graduation that falls through the second screen 230 is further separated by suction device 310. The width graduation that falls through the third screen 240 is further separated by suction device 320. The description of the suction devices 310 and 320, for the second screen 230 and third screen 240 respectively, are duplicative of the description with respect to suction device 300, and need not be repeated. However, it must be understood that while the suction devices 310 and 320 are preferably constructed substantially similar to the suction device 300, each of these devices separate product graduations of a different size. In particular, the second screen 230 and corresponding suction device 310 preferably perform their operations on medium pieces. Likewise, the third screen 240 and the suction device 320 preferably perform their operations on large and extra large pieces. The amount of air flow required within each suction device 300, 310, 320 may be different for proper separation of meat from shells in each of these graduations.

The most valuable products in a pecan shelling process are unbroken pecan meat halves. The fourth screen 250 is preferably adapted to allow stick-tight and stick-tight free pecan halves to fall therethrough. As indicated by line 252, the stick-tight and stick-tight free pecan halves are preferably applied to suction device 330. Suction device 330 operates in a manner substantially the same as suction devices 300, 310 and 320, but on pecan meat halves and shells of substantially the same size. However, the suction device 330 is preferably set with a relatively high air flow. In particular, the suction device 330 is preferably set such that heavy stick-tight and stick-tight free meat falls through the suction device, while lighter halves and shells rise with the air flow. In the preferred embodiments, the heavy stick-tight and stick-tight free meat is then preferably applied, as indicated in line 254, to a thickness separation device 256. In the preferred embodiment, this thickness separation device is a plurality of substantially parallel steel rollers. The steel rollers are preferably spaced such that stick-tight meat, when orienting its thickness to be between the rollers, will not fall therethrough. The stick-tight meat is preferably conveyed to a sheller 260 as indicated by line 258. The shelled product of the sheller is then preferably applied to the first screen 208, as indicated in line 262, where the separation process begins anew.

Figure 6:
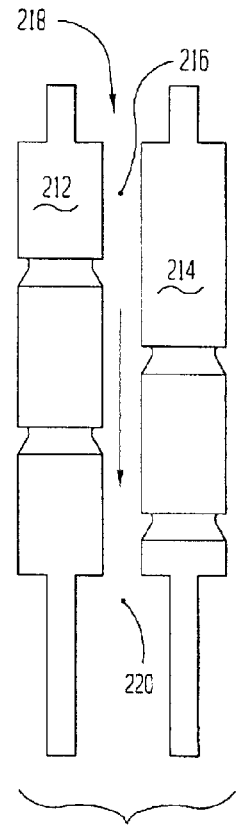
FIG. 6 shows an overhead view of two parallel cylinders for width separation of the preferred embodiment.

FIG. 6 shows an overhead view of one set of parallel steel rollers of the preferred embodiment. In particular, FIG. 6 shows a first roller 212 and a second roller 214. Preferably, each roller 212, 214 are rotating away from each other such that the direction of rotation as measured between them is substantially opposite the pull of gravity. The two rollers 212, 214 define a slot 216 in which thickness separations are made. Pecan parts are applied to the parallel rotating cylinders 212 and 214 near an upper end 218. The pecan parts naturally orient their thickness between the two cylinders in the slot 216. Because the cylinders 212 and 214 are sloped from their upper end 218, having a higher elevation, toward their lower end 220, the pecan parts applied thereto slide from the upper end 218 to the lower end 220 in the direction indicated by the arrow in the slot 216. If the pecan parts have thickness greater than the slot, those pecan parts slide the length of the cylinders. If, however, the pecan parts have a thickness less than the slot, those pecan parts fall through. In the preferred embodiments, the slot is set such that stick-tight free meat may fall therethrough, and stick-tight meat does not.

Figure 7:
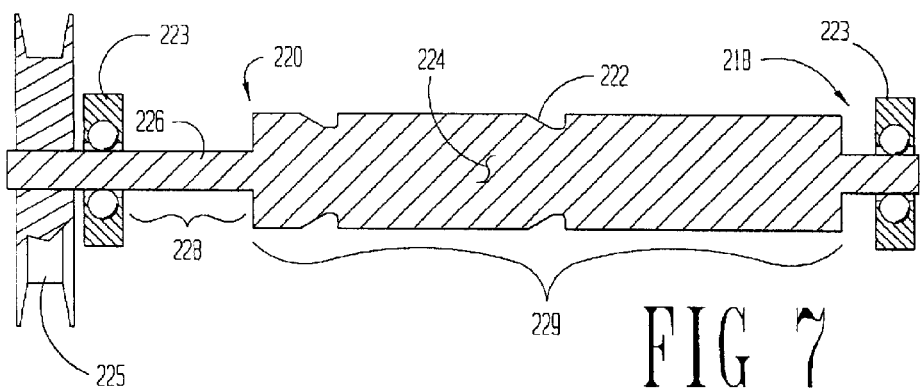
FIG. 7 shows a cross-sectional view of a width separation cylinder of the preferred embodiment.

FIG. 7 shows a cross-sectional view of a single cylinder 212 or 214. Preferably, each cylinder 212, 214 is turned from a solid piece of steel. As indicated in FIG. 7, a portion of the cylinder 212, 214 has a larger diameter, portion 224, and a second portion is milled to have a smaller diameter 226. The thickness separation in the preferred embodiment takes place in the slot formed between two cylinders 212 and 214 at their larger diameters 224. If any particular pecan part has a thickness greater than the slot, that pecan part slides off the lower end 220 and falls between the two smaller diameter 226 portions of the steel cylinders 212, 214. Thus, those pecan parts that fall through the cylinders in the slot region between the larger diameter portions form a thinner product portion 229 and a thicker product portion 228. Further, each cylinder 212, 214 preferably has circumferential notches 222 cut into the larger diameter 224 portion. As described in the patents discussed in the Background section, these notches account for the random presence of a tip or knob on the pecan halves. FIG. 7 also shows the preferred placement of the bearings 223 as well as pulley 225. Each cylinder 212, 214 mechanically couples to an electric motor by way of a belt threaded around the pulley 225. Because of the number of pecans applied to the pecan processing assembly of the preferred embodiment, six sets of rollers 212, 214 are used to perform the width separation indicated at block 256. However, it must be understood that the number of sets of rollers 212, 214 is dictated by the desired throughput for the particular pecan processing machine 200, and thus more may be needed if the rate that pecans are fed in the machine is increased, and fewer may be needed if the rate decreases.

The halves that fall through the thickness separation device 256, stick-tight free meat and possibly shells of substantially the same size, are preferably applied to another suction device 340, as indicated by line 264. The suction device 340 works substantially the same as the suction device 300, described with respect to FIG. 5, and thus no additional explanation regarding the structure is required. The suction device 340 is adjusted so that substantially only stick-tight free halves are allowed to fall therethrough, and as indicated by line 266, these halves are placed in product barrels for further processing. If correctly adjusted, the suction device 340 carries away shells, which are sent to cyclone separation as indicated by line 268.

Referring still to FIG. 2, the light halves that are picked up by the suction device 330 are preferably conveyed to an aspirator 420. The aspirator 420 works substantially the same as aspirator 400 described with respect to FIGS. 3 and 4. However, in this case, the air flow through aspirator 420 is preferably set to separate light halves from shells. Thus, the heavier of the shells and light halves pass through the air lock of the aspirator 420, and shells that are carried by the air flow within the aspirator 420 move to the cyclone separation. As indicated in FIG. 2, the light halves and other product that pass through the air lock of the aspirator 420 are preferably conveyed to a suction device 350 as indicated by line 270. This suction device makes a final separation of meat halves from any remaining shell. The meat halves are conveyed to the product barrels as indicated by line 272, and the remaining shell is conveyed to the disposal process as indicated by line 274.

That portion of the cracker product that did not fall through any of the co-planar screens is conveyed, by the vibratory motion of those screens, off the end of the fourth screen 250 to a shelling device, which in the preferred embodiments is a plurality of sets of rubber rollers 500, as indicated by line 276. That portion of the cracker product that is conveyed off the end of the fourth screen 250 comprises whole uncracked nuts, and substantially whole cracked nuts. Each set of rubber rollers comprises a pair of substantially parallel rotating cylinders. Each of these cylinders preferably has a rubber coating on an outer surface thereof, and the cylinders are rotating such that, as measured between them, the direction of travel is substantially the direction of the pull of gravity. The rubber rollers are preferably spaced such that substantially whole cracked pecans are further broken, but that whole uncracked pecans pass unaffected. U.S. Pat. No. 5,879,734 and 6,135,020 describe using parallel rubber coated cylinders as a mechanism to further shell previously cracked pecans. For brevity, that description will not be repeated here. The rubber coated cylinders of the preferred embodiments of this invention differ in the number used, which in the preferred embodiments are ten (five pairs), which is based on the rate that pecans are fed to the nut processing unit 200, and physical structure of the rollers themselves. In particular, in the '734 and '020 patents, it is described that rubber is coated on the outer surface of a hollow cylinder, and that bearings are press fit on each end of each cylinder. In the preferred embodiments of this invention, the rubber coated cylinders are preferably made from a solid piece of steel having a cylindrical cross-section. Ends of the steel member are preferably turned to a diameter which allows the bearing structures to slide over the ends of the turned portion. While operation of the parallel rubber coated cylinders does not change between the two structures, the structures of the preferred embodiment of this invention are more easy to construct and maintain.

The product stream leaving the sets of rubber rollers 500 comprises whole uncracked nuts, and various sizes of nut parts created by the further shelling of the substantially whole cracked nuts that entered the rubber rollers 500. This product stream is preferably conveyed to a scalper 280 after having dust and small shells removed by a dust suction wand 278. One of ordinary skill in the art is aware of the operation and construction of a dust wand 278.

The scalper 280 is effectively a thickness separation device. While it may be possible to separate the product stream leaving the rubber rollers 500 using the parallel rotating cylinders, such as at the thickness separation device 256, in the preferred embodiments the width separation 280 is accomplished by a vibratory screen having a plurality of oblong holes therein. These holes are preferably sized to allow only whole uncracked nuts and substantially whole cracked nuts that were not further broken by the rubber rollers to pass thereover. That portion that falls through the scalper 280 is preferably conveyed to the first screen 208 for further processing, as indicated by line 282. That portion that do not pass through the scalper 280 are preferably conveyed to a sorting device being a pin sorter 600. It is also noted that separating the uncracked nuts and substantially whole cracked nuts in this instance may be accomplished with a width separation device such as a screen having circular holes.

Figure 8:
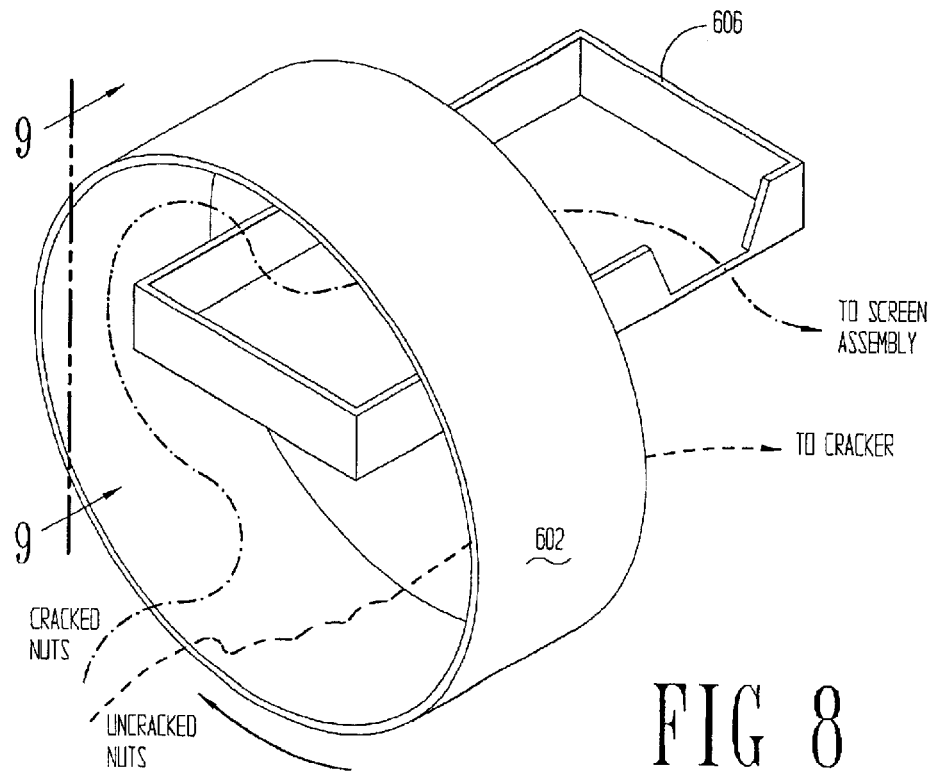
FIG. 8 shows a simplified perspective view of a pin sorter of the preferred embodiment.

In broad terms the pin sorter 600 separates cracked pecans from uncracked pecans. The uncracked pecans are conveyed to the cracker 204, as indicated by line 286. Cracked pecans separated by the pin sorter 600 are preferably conveyed back to the first screen as indicated by line 284. This method presents a more efficient handling of the cracked and uncracked pecans than prior methods. In particular, conveying the cracked pecans back to the first screen, and then through the rest of the separation process, relies on the less harsh method and structure of the rubber coated cylinders to further shell the cracked pecans. Uncracked pecans, however, are sent back to the cracker. FIG. 8 shows a simplified perspective view of a pin sorter 600 of the preferred embodiments. The pin sorter 600 preferably has a rotating outer cylinder 602 having a plurality of pins (not shown in FIG. 8) mounted on an inside surface. Pecans and pecan parts are preferably conveyed to the inside diameter of the rotating cylinder 62 where they come in contact with the pins thereon.

Figure 9:
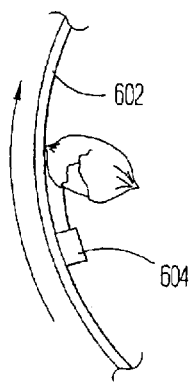
FIG. 9 shows an elevational view of a portion of a pin sorter taken substantially along line 9—9 of FIG. 8.

FIG. 9 shows a partial elevational view of the pin sorter 600 taken substantially along line 9—9 of FIG. 8. In particular, FIG. 9 shows the rotating cylinder 602 which rotates in the direction shown by the arrow in FIG. 9. On an inside diameter of the cylinder 602 is a pin mechanism 604. Preferably, the sharp point of the pin 604 points generally the direction of rotation of the cylinder 602. As exemplified in FIG. 9, when a cracked nut or pecan part encounters one of the many pins 604 on the inside diameter of the rotating cylinder 602, that pin tends to pick up the cracked nut by lodging in the crack or other open location on the nut. By operation of rotation of the cylinder 602, that pecan or pecan part is then carried, as indicated by the dash-dot line of FIG. 8, to an upper tray 606. While the pecan part picked up by the pin 604 may fall off on its own when it reaches the apex of the rotating cylinder 602, preferably brushes (not shown) push the nut or nut part off the pin onto the tray 606. These nut parts, which preferably represent only cracked pecans and pecan pieces, are then conveyed to the first screen 208 as shown in FIG. 2. Whole uncracked pecans, by definition, are not cracked and thus present no location where a pin 604 may connect and carry it up with rotation. Thus, whole cracked pecans preferably jostle around at a lower part of the rotating cylinder 602 until they are conveyed off the end, as indicated by the dashed line in FIG. 8. These whole uncracked nuts are then passed to the cracker 204 as indicated by line 282. In this way, substantially only the whole uncracked nuts are passed to the crackers 204 for further processing. Pin sorters such as those described herein may be obtained from American International Manufacturing of Woodland, Calif.

Referring again to FIG. 2, it is seen that five final product streams are created. In particular, the first screen 208 and suction assembly 300 create a stream containing small and midget size pieces 234. The second screen 230 and suction device 310 create a medium size product stream 236. The third screen 240 and suction device 320 separate a large and extra large size product stream 238. The fourth screen 250, suction device 330, aspirator 420 and suction device 350 create a product stream 242 comprising light halves. Finally, the fourth screen 250, suction device 330, thickness separation 256 and suction device 340 create a product stream 244 comprising substantially pecan halves. As indicated above, preferably each of these streams 234, 236, 238, 242 and 244 are caught in product barrels and are then taken to further processing of the prior art. For the halves in product stream 244, this further processing may include only color separation and final boxing. For the light halves stream 242 and large and extra large stream 238, this further processing may include a water float separation, whereby any remaining shell floats and the meat sinks, color separation and then final boxing. As for streams 234 and 236, the further processing may include alcohol floats (to kill and remove worm product, and also to remove any remaining shell), color separation and final boxing. One of ordinary skill in the art is aware how to perform these further prior art processing techniques.

FIG. 2 further indicates that the lighter product separated in the suction devices 300, 310, 320, 330, 340 and 350, as well as the lighter product separated by the aspirators 400 and 420, are conveyed to cyclone separation. Preferably, an individual cyclone separation is provided for each of the lighter products of suction device 300, 310, 320 and 330. As one of ordinary skill in the art is aware, a cyclone separation device applies the dust and shell separated in suction and aspiration devices to the inside diameter of a cylinder having a circular cross-section. The shells and dust enter tangentially to a side and thus swirl within the cyclone separation device. Heavier products are thrown outward to the inner walls, and by virtue of slower air speeds near the wall because of the viscous air flow, fall along the inner wall and collect near the bottom. Lighter products, including dust, tend to remain trapped in the air flow and are preferably piped outside the nut processing facility and disposed of using normal dust disposal procedures. The suction devices 300, 310, 320 and 330 preferably have their own cyclone separation so that the heavier product can be inspected. If the heavier product contains meat, this is an indication that the suction devices need adjustment. While this is the preferred method, it is possible that the lighter product created in all the suction devices and aspirators may be separated in a single large cyclone, and heavier product disposed of in accordance with the prior art as well as dust disposal in accordance with the prior art. In the preferred embodiment, suction is provided for all the aspirators and suction devices by means of a single fan operated by a 75 horsepower motor. While this is the preferred implementation, it is possible to have a plurality of smaller size motors turning a plurality of smaller fans to provide the necessary suction. Further, the motor or motors need not be electrical, but may be of any type such as gas, diesel, and the like.

The above discussion is meant to be illustrative of the principles and various embodiments of the present invention. Numerous variations and modifications will become apparent to those skilled in the art once the above disclosure is fully appreciated. For example, in the preferred embodiments the first screen through the fourth screen are described as being co-planar. However, the nut processing system of the preferred embodiment may be practiced equally well with stacked vibrating screens. Further, separation device 256 is described as a plurality of sets of parallel rotating cylinders. While this is the preferred embodiment, these cylinders perform a thickness separation, which may likewise be performed by any device which creates an elongated slot, including a vibrating screen having oblong holes. It must further be understood that there are no industry-wide standards for sizing pecan parts. Thus, though the inventors herein have delineated the parts as small and midgets, mediums, large and extra large, and halves, other categories of sizes may be created and still would be within the contemplation of this invention. No fine distinctions should be drawn as to particular size categories or product stream sizes. It is intended that the following claims be interpreted to embrace all such variations and modifications.

What is claimed is:

1. In a pecan processing facility having a cracker producing a primary cracker product feeding a width separation device, and the cracker also producing a secondary cracker product, a method of operating the pecan processing plant comprising:

separating the secondary cracker product by weight into a lighter portion, and a heavier portion; and then applying the heavier portion to the width separation device.

2. The method of operating a pecan processing plant as defined in claim 1 further comprising:

transporting the secondary cracker product to a separation device by:

moving air through a conduit; and carrying the secondary cracker product in the air moving through the conduit to the separation device.

3. The method of operating a pecan processing plant as defined in claim 2 wherein moving air through the conduit further comprises creating a vacuum within the conduit.

4. The method of operating a pecan processing plant as defined in claim 3 wherein moving air through a conduit further comprises moving are through a conduit having a substantially circular cross-section.

5. The method of operating a pecan processing plant as defined in claim 2 wherein separating the secondary cracker product by weight into a lighter portion and a heavier portion further comprises:

forcing the secondary cracker product and air downward;

counter-flowing air upward through the secondary cracker product;

carrying the lighter portion with the counter-flowing air; and allowing the heavier portion to fall to an air lock.

6. The method of operating a pecan processing plant as defined in claim 1 further comprising disposing of the lighter portion of the secondary cracker product.

7. A method of operating a pecan shelling plant comprising:

cracking pecans to produce a cracker product stream;

sizing the cracker product stream into a plurality of width graduations;

sorting uncracked pecans from substantially whole cracked pecans of a largest width graduation; and returning the uncracked pecans to the cracker.

8. The method of operating a pecan shelling plant as defined in claim 7 further comprising, before the sorting step, shelling the largest width graduation to further break shells of cracked pecans, and pass unaffected uncracked pecans.

9. The method of operating a pecan shelling plant as defined in claim 8 wherein shelling the largest width graduation further comprises passing the largest width graduation through a pair of substantially parallel rotating rubber coated cylinders adjusted to further shell cracked pecans and pass unaffected uncracked pecans.

10. The method of operating a pecan shelling plant as defined in claim 7 wherein sorting the uncracked pecans from the largest width graduation further comprises:

sorting the largest width graduation by thickness into a thicker range comprising uncracked pecans and substantially whole cracked pecans; and separating the uncracked pecans from the thicker range.

11. A method of operating a pecan shelling plant comprising:

cracking pecans to produce a cracker product stream;

sizing the cracker product stream into a plurality of width graduations;

sorting a largest width graduation by thickness into a thicker range comprising uncracked pecans and substantially whole cracked pecans;

applying the thicker range to a pin sorter which separates the uncracked pecans from the substantially whole cracked pecans; and returning substantially only the uncracked pecans to the cracker.

12. The method of operating a pecan shelling plant as defined in claim 10 further comprising returning the substantially whole cracked pecans to the sizing step.

13. A method of operating a pecan processing plant comprising:

cracking pecans to produce a primary cracker product and a secondary cracker product;

separating the secondary cracker product by weight into a lighter portion comprising shells and dust, and a heavier portion comprising pecan meat;

sizing the heavier portion of the secondary cracker product and the primary cracker product into a plurality of width graduations;

sorting uncracked pecans from substantially whole cracked pecans of a largest width graduation; and returning the uncracked pecans to the cracker.

14. The method of operating a pecan processing plant as defined in claim 13 further comprising:

transporting the secondary cracker product to a weight separation device by:

moving air through a conduit; and carrying the secondary cracker product in the air moving through the conduit to the weight separation device.

15. The method of operating a pecan processing plant as defined in claim 14 wherein moving air through the conduit further comprises creating a vacuum within the conduit.

16. The method of operating a pecan processing plant as defined in claim 15 wherein moving air though the conduit further comprises moving air through the conduit having a substantially circular cross-section.

17. The method of operating a pecan shelling plant as defined in claim 13 further comprising, before the sorting step, shelling the largest width graduation further cracking cracked pecans and passing unaffected uncracked pecans.

18. The method of operating a pecan shelling plant as defined in claim 17 wherein shelling the largest width category further comprises passing the largest width graduation through a pair of substantially parallel rubber coated cylinders rotating substantially along the pull of gravity as measured between them, and wherein the spacing between the pair of rubber coated cylinders is such that uncracked pecans pass through unaffected.

19. The method of operating a pecan shelling plant as defined in claim 13 wherein sorting the uncracked pecans from the largest width graduation further comprises:

sorting the largest width graduation by thickness into a thicker range comprising uncracked pecans and substantially whole cracked pecans; and sorting the thicker range into uncracked pecans and substantially whole cracked pecans.

20. A method of operating a pecan processing plant comprising:

cracking pecans to produce a primary cracker product and a secondary cracker product;

separating the secondary cracker product by weight into a lighter portion comprising shells and dust, and a heavier portion comprising pecan meat;

sizing the heavier portion of the secondary cracker product and the primary cracker product into a plurality of width graduations;

sorting the largest width graduation by thickness into a thicker range comprising uncracked pecans and substantially whole cracked pecans;

applying the thicker range to a pin sorter which separates the uncracked pecans from the substantially whole cracked pecans; and returning substantially only the uncracked pecans to the cracker.

21. The method of operating a pecan shelling plant as defined in claim 20 further comprising returning the substantially whole cracked pecans to the sizing step.

22. In a nut processing facility having a cracker producing a primary cracker product feeding a width separation device, and the cracker also producing a secondary cracker product, a method of operating the nut processing plant comprising:

separating the secondary cracker product by weight into a lighter portion, and a heavier portion; and then applying the heavier portion to the width separation device.

23. The method of operating a nut processing plant as defined in claim 22 further comprising:

transporting the secondary cracker product to a separation device by:
moving air through a conduit; and
carrying the secondary cracker product in the air moving through the conduit to the separation device.

24. The method of operating a nut processing plant as defined in claim 23 wherein moving air through the conduit further comprises creating a vacuum within the conduit.

25. The method of operating a nut processing plant as defined in claim 24 wherein moving air through a conduit further comprises moving are through a conduit having a substantially circular cross-section.

26. The method of operating a nut processing plant as defined in claim 24 wherein separating the secondary cracker product by weight into a lighter portion and heavier portion further comprises:

forcing the secondary cracker product and air downward;

counter-flowing air upward through the secondary cracker product;

carrying the lighter portion with the counter-flowing air; and allowing the heavier portion to fall to an air lock.

27. The method of operating a nut processing plant as defined in claim 26 further comprising disposing of the lighter portion of the secondary cracker product.

28. A method of operating a nut shelling plant comprising:
cracking nuts to produce a cracker product stream;
sizing the cracker product stream into a plurality of width graduations;
sorting uncracked nuts from substantially whole cracked nuts of a largest width graduation; and
returning substantially only the uncracked nuts to the cracker.

29. The method of operating a nut shelling plant as defined in claim 28 further comprising, before the sorting step, shelling the largest width graduation to further break shells of cracked nuts, and pass unaffected uncracked nuts.

30. The method of operating a nut shelling plant as defined in claim 29 wherein shelling the largest width graduation further comprises passing the largest width graduation through a pair of substantially parallel rotating rubber coated cylinders adjusted to further shell cracked nuts and pass unaffected uncracked nuts.

31. The method of operating a nut shelling plant as defined in claim 28 wherein sorting the uncracked nuts from the largest width graduation further comprises:

sorting the largest width graduation by thickness into a thicker range comprising uncracked nuts and substantially whole cracked nuts; and separating the uncracked nuts from the thicker range.

32. A method of operating a nut shelling plant comprising:
cracking nuts to produce a cracker product stream;
sizing the cracker product stream into a plurality of width graduations;
sorting the largest width graduation by thickness into a thicker range comprising uncracked nuts and substantially whole cracked nuts;
applying the thicker range to a pin sorter which separates the uncracked nuts from the substantially whole cracked nuts; and
returning substantially only the uncracked nuts to the cracker.

33. The method of operating a nut shelling plant as defined in claim 31 further comprising returning the substantially whole cracked nuts to the sizing step.

\* \* \* \* \*